United States Patent
Sobu et al.

(10) Patent No.: US 11,474,409 B2
(45) Date of Patent: Oct. 18, 2022

(54) OPTICAL MODULATOR AND OPTICAL MODULATION METHOD

(71) Applicant: FUJITSU LIMITED, Kawasaki (JP)

(72) Inventors: Yohei Sobu, Chiyoda (JP); Shinsuke Tanaka, Hiratsuka (JP)

(73) Assignee: FUJITSU LIMITED, Kawasaki (JP)

( * ) Notice: Subject to any disclaimer, the term of this patent is extended or adjusted under 35 U.S.C. 154(b) by 29 days.

(21) Appl. No.: 17/220,056

(22) Filed: Apr. 1, 2021

(65) Prior Publication Data

US 2022/0019120 A1 Jan. 20, 2022

(30) Foreign Application Priority Data

Jul. 17, 2020 (JP) .............................. JP2020-122618

(51) Int. Cl.
  *G02F 1/21* (2006.01)
  *G02F 1/225* (2006.01)

(52) U.S. Cl.
  CPC ............ *G02F 1/212* (2021.01); *G02F 1/2255* (2013.01)

(58) Field of Classification Search
  CPC ...... G02F 1/212; G02F 1/0121; G02F 1/2255; G02F 2201/12; G02F 2201/20
  USPC .......................................................... 385/1–3
  See application file for complete search history.

(56) References Cited

U.S. PATENT DOCUMENTS

| | | | |
|---|---|---|---|
| 9,939,708 B2* | 4/2018 | Aimone | G02F 1/2257 |
| 2008/0089634 A1* | 4/2008 | Mosinskis | G02F 1/0121 |
| | | | 385/3 |
| 2011/0044573 A1* | 2/2011 | Webster | H04B 10/5053 |
| | | | 385/3 |
| 2017/0052394 A1 | 2/2017 | Goodwill | |

FOREIGN PATENT DOCUMENTS

| | | |
|---|---|---|
| JP | 2014-006389 A | 1/2014 |
| JP | 2015-219500 A | 12/2015 |

OTHER PUBLICATIONS

A. Aimone, "InP Segmented Mach-Zehnder Modulators with Advanced Electro-Optical Functionalities," 2016 IEEE Compound Semiconductor Integrated Circuit Symposium (CSICS), 2016, pp. 1-4, doi: 10.1109/CSICS.2016.7751047.*

* cited by examiner

*Primary Examiner* — Michael P Mooney
(74) *Attorney, Agent, or Firm* — Fujitsu Patent Center

(57) ABSTRACT

An optical modulator, that includes a Mach-Zehnder interferometer and three or more segments, generates an optical signal based on three or more electric signals transmitted in parallel. The three or more segments are provided in series along an optical path of the Mach-Zehnder interferometer and respectively shift a phase of light propagating through the optical path based on the three or more electric signals. A length of at least one of the three or more segments is different from lengths of the other segments. Optical path lengths from input ends of respective segments to input ends of corresponding next segments are the sae.

8 Claims, 16 Drawing Sheets

Related Art

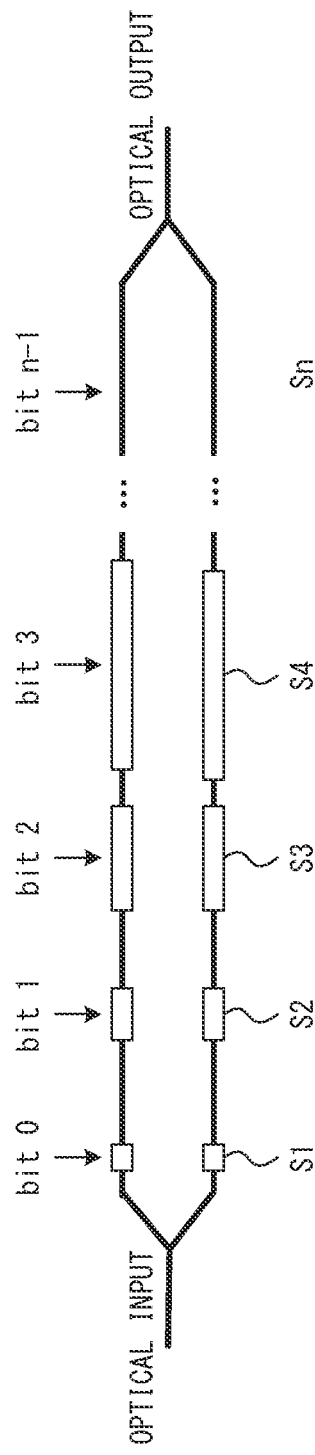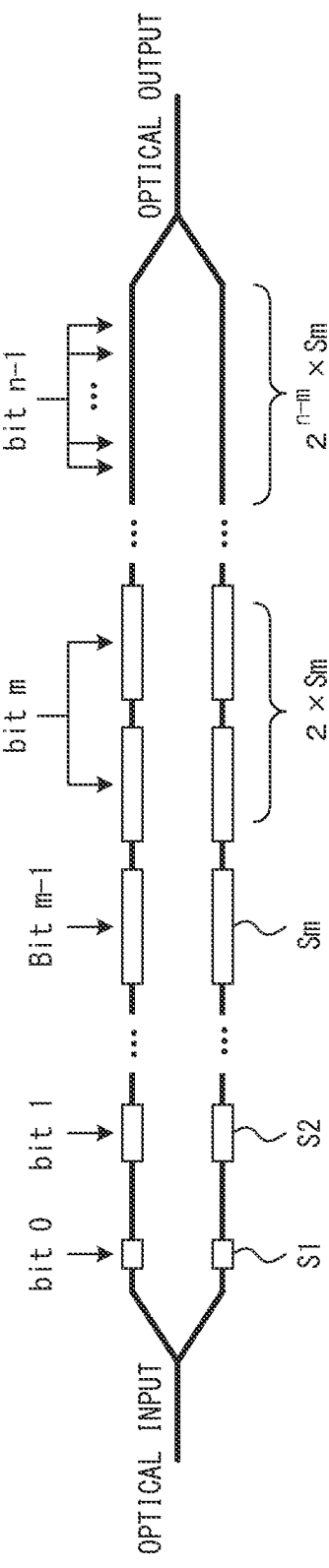

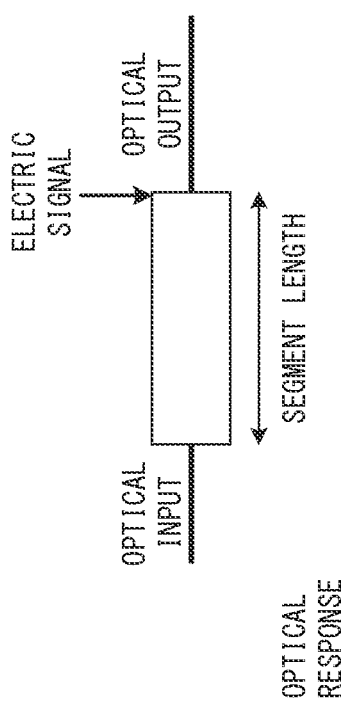
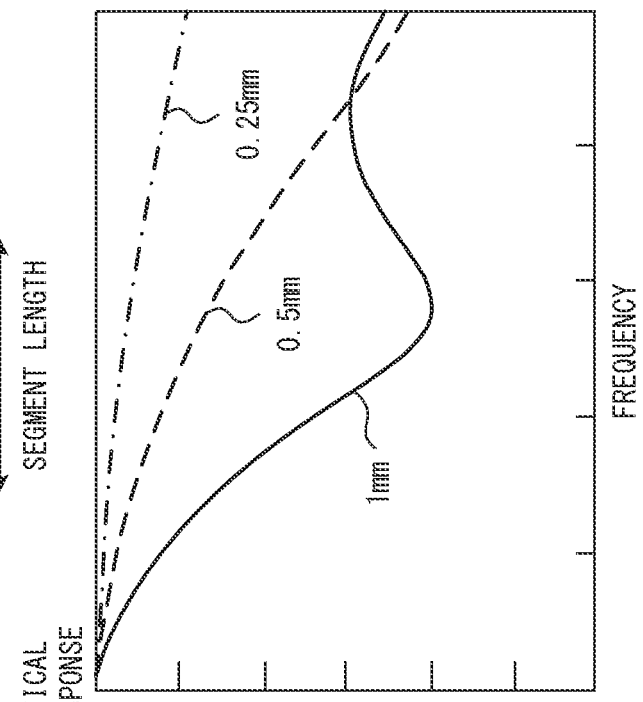
FIG. 10A
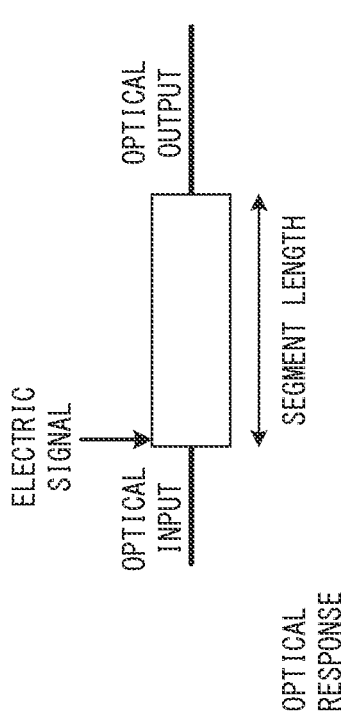
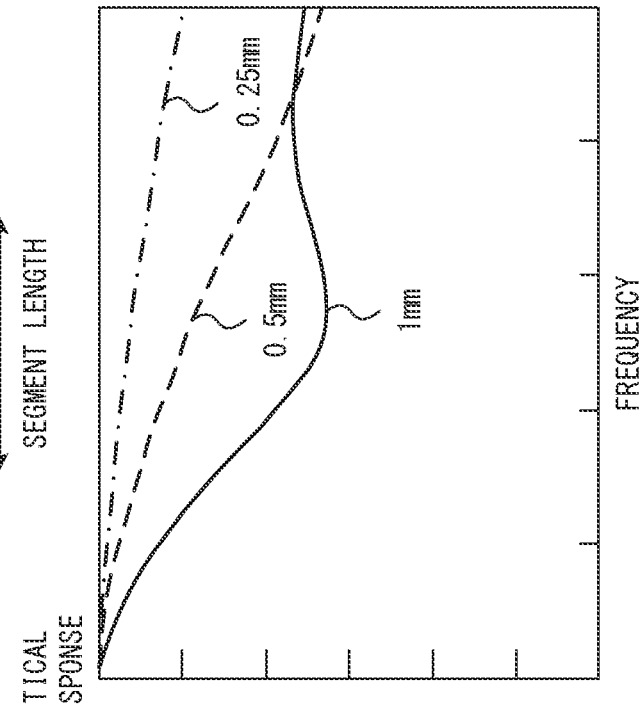
FIG. 10B

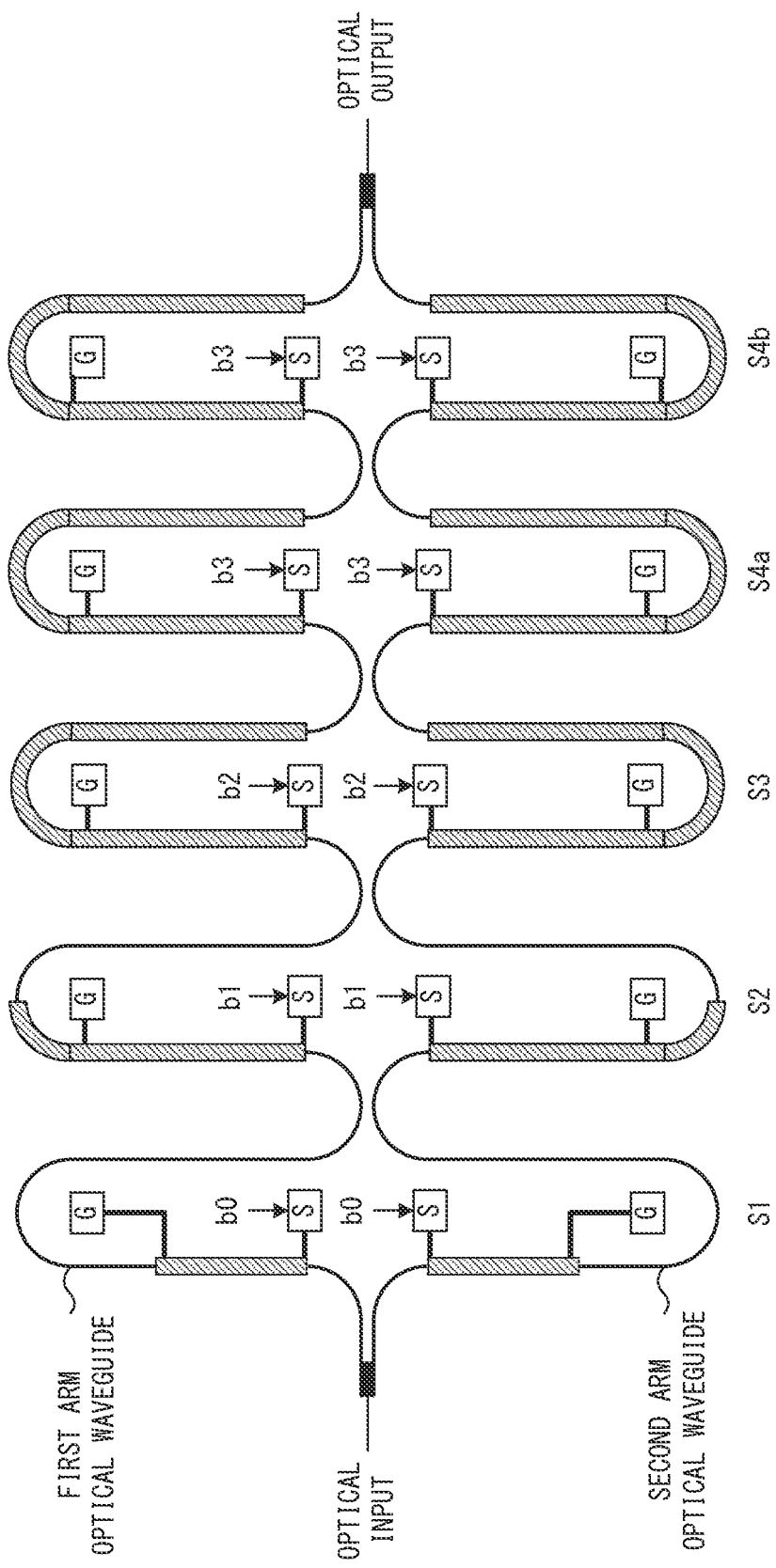
F I G. 11

F I G. 13A
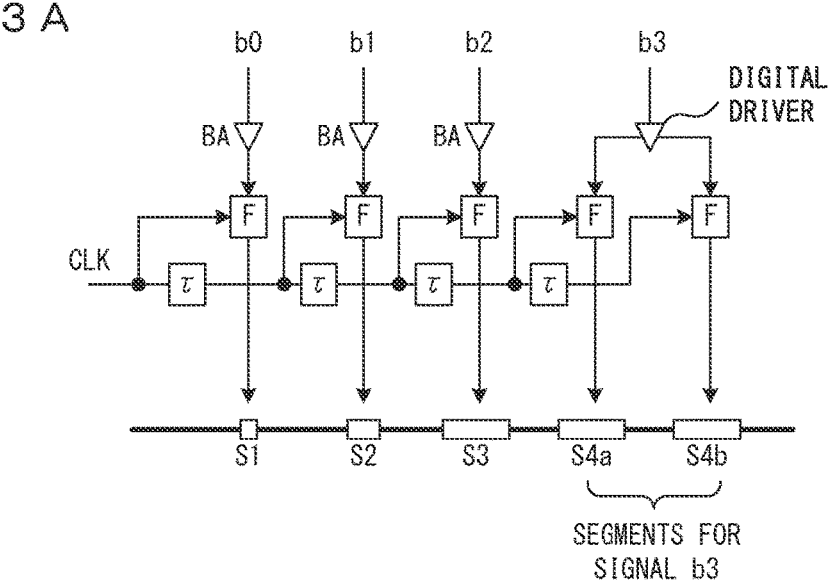
F I G. 13B
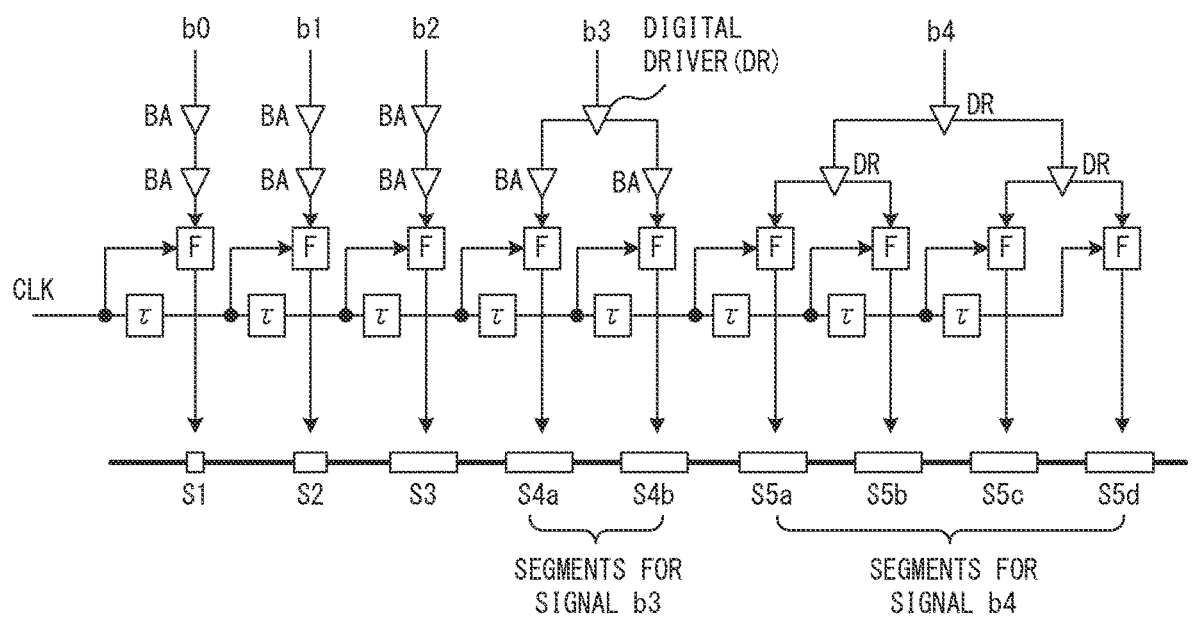

OPTICAL MODULATOR AND OPTICAL MODULATION METHOD

CROSS-REFERENCE TO RELATED APPLICATION

This application is based upon and claims the benefit of priority of the prior Japanese Patent Application No. 2020-122618, filed on Jul. 17, 2020, the entire contents of which are incorporated herein by reference.

FIELD

The embodiments discussed herein are related to an optical modulator and an optical modulation method for generating an optical signal based on three or more electric signals.

BACKGROUND

An optical modulator is one of key devices for implementing long-distance and large-capacity optical transmissions. For example, the optical modulator may generate a modulated optical signal by modulating continuous wave light with an electric signal corresponding to transmission data generated by a digital signal processor (DSP). FIGS. 1A and 1B illustrate examples of optical transmitters that include optical modulators.

In the configuration depicted in FIG. 1A, transmission data (digital signal) generated by a DSP is converted by a digital-to-analog converter (DAC) into an analog signal. An output signal of the DAC is amplified by an analog driver (linear driver) and supplied to an optical modulator. The optical modulator includes optical waveguides forming a Mach-Zehnder interferometer, and electrodes are formed in the vicinity of the optical waveguides. Continuous wave light is input to the Mach-Zehnder interferometer. When an output signal of the driver is supplied to the electrodes, the phase of light propagating thorough the waveguides will change in response to the signal, and a modulated optical signal indicating the transmission data will be output. An electrode to which an electric signal indicating transmission data is supplied (i.e., an electrode used as a phase shifter) may hereinafter be referred to as a "segment."

In this configuration, the DSP outputs 2-bit parallel data when generating optical signals with symbols each for carrying two bits of data. Thus, analog signals at four levels are output from the DAC, thereby generating a 4-pulse amplitude modulation (4PAM) optical signal. However, as the baud rate increases in this configuration, an analog signal having a larger amplitude is required to provide a sufficient optical amplitude, thereby leading to larger power consumption of the driver.

This problem can be solved or alleviated by, for example, the configuration depicted in FIG. 1B. The optical modulator depicted in FIG. 1B includes an electrode for each of a plurality of bits forming a symbol. In particular, when each symbol carries two bits of data, the optical modulator includes an electrode for the low-order bit (LSB segment) and an electrode for the high-order bit (MSB segment). Assume that signals having the same voltage amplitude are input to the segments and the length of the MSB segment is twice that of the LSB segment. In addition, corresponding transmission bits are supplied to each of the segments, and a 4PAM optical signal is generated. In comparison with the configuration depicted in FIG. 1A, this configuration is such that the amplitude of an electric signal supplied to the optical modulator does not need to be increased, and inverter drivers through which a current flows only during data transition can be used, thereby reducing power consumption. According to the modulation scheme depicted in FIG. 18, a digital signal is supplied to a Mach-Zehnder interferometer, and an analog signal is generated in an optical domain. Thus, this modulation scheme may be referred to as an "optical DAC."

Optical modulators that include a plurality of segments (or electrodes) different in length are described in, for example, Japanese Laid-open Patent Publication No. 2015-219500 and U.S. Patent Publication No. 2017/0052394. Meanwhile, Japanese Laid-open Patent Publication No. 2014-006389 describes an optical modulator circuit.

As described above, providing a plurality of segments for generating multilevel optical signals will reduce power consumption of an optical modulator or an optical transmitter. However, in this configuration, as modulation is enhanced (as the modulation level increases), the controlling of a circuit for adjusting the timings of electric signals supplied to segments will become more complicated.

SUMMARY

According to an aspect of the embodiments, an optical modulator generates an optical signal based on three or more electric signals transmitted in parallel. The optical modulator includes: a Mach-Zehnder interferometer; and three or more segments that are provided in series along an optical path of the Mach-Zehnder interferometer and respectively shift a phase of light propagating through the optical path based on the three or more electric signals. A length of at least one of the three or more segments is different from lengths of the other segments. Optical path lengths from input ends of respective segments to input ends of corresponding next segments are the same.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 8A and 8B illustrate variations of segment configurations;

FIGS. 10A and 10B illustrate relationships between segment lengths and optical responses;

FIG. 11 illustrates a configuration example of waveguides and electrodes in an optical modulator;

FIGS. 13A and 13B illustrate other configuration examples of a delay adjustment circuit in an optical modulator;

DESCRIPTION OF EMBODIMENTS

Figure 1A:
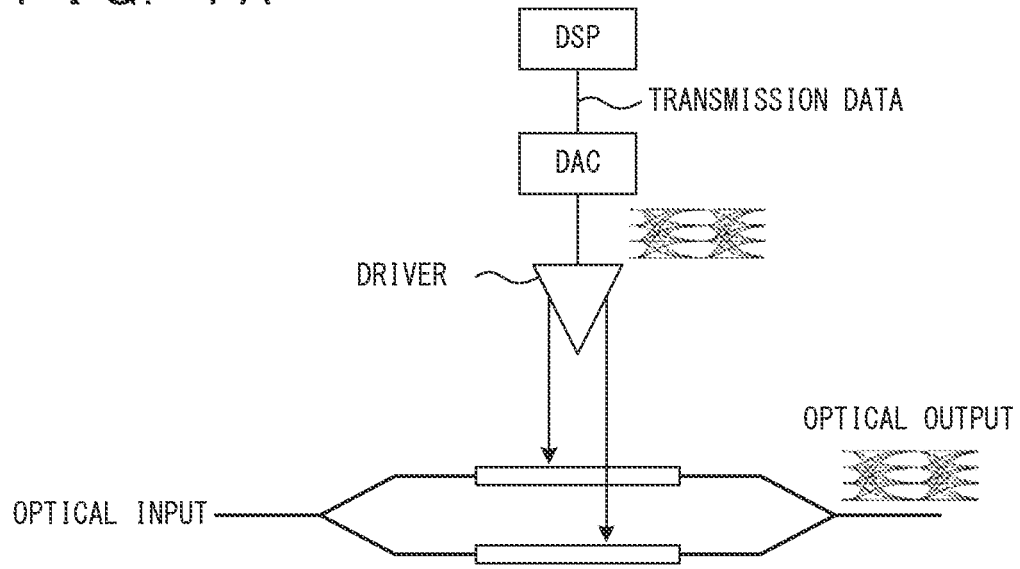
FIGS. 1A and 1B illustrate examples of optical transmitters that include optical modulators.
Figure 1B:
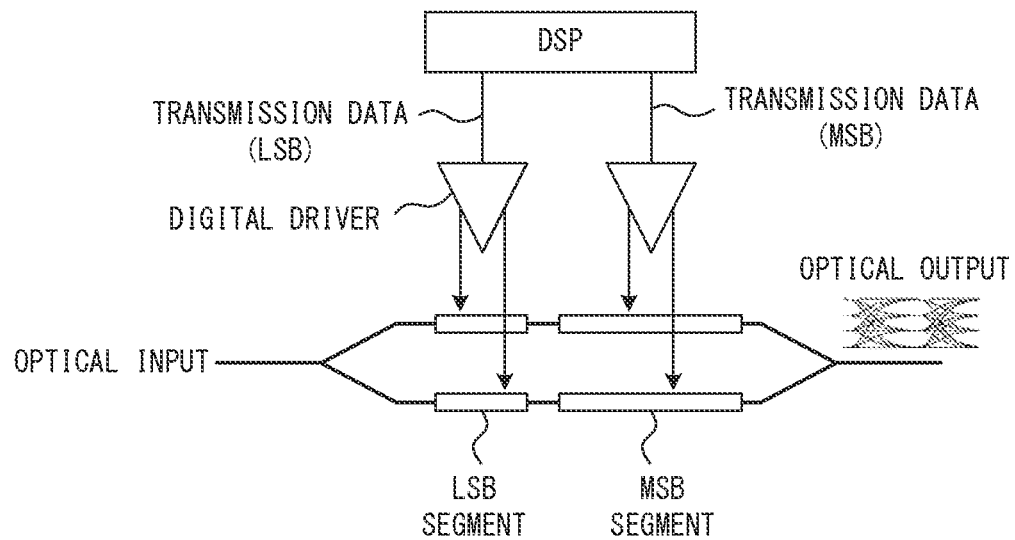
Figure 2A:
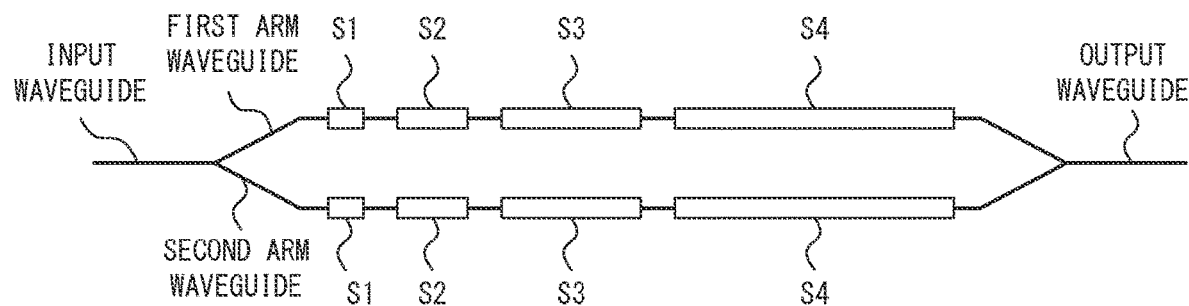
FIGS. 2A-2C illustrate examples of the configurations and operations of an optical modulator.
Figure 2B:
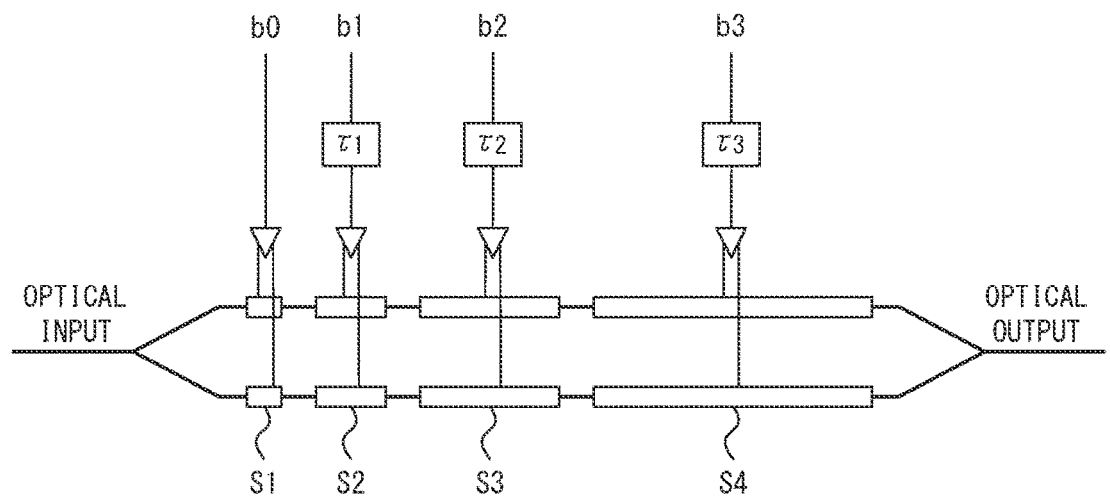
Figure 2C:
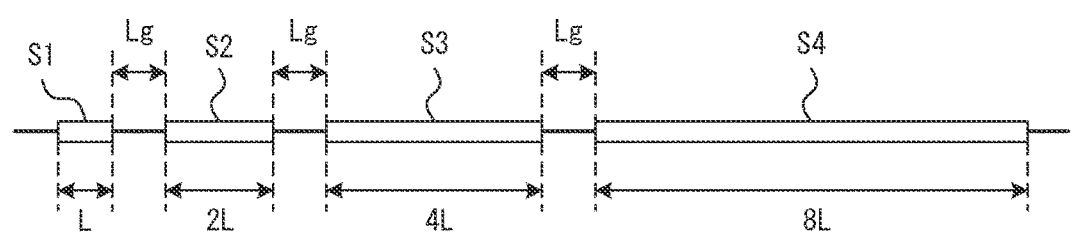

FIGS. 2A-2C illustrate examples of the configurations and operations of an optical modulator. The optical modulator generates an optical signal by using an optical DAC scheme. Thus, a digital signal is supplied to the optical modulator, and an analog signal is generated in an optical domain. In the meantime, the optical modulator depicted in FIGS. 2A-2C generates, for each symbol, an optical signal for carrying four bits of data. For example, a 16PAM optical signal may be generated.

As depicted in FIG. 2A, the optical modulator includes a Mach-Zehnder interferometer. The Mach-Zehnder interferometer includes an input optical waveguide, a first arm optical waveguide, a second arm optical waveguide, and an output optical waveguide. Input ends of the first arm optical waveguide and the second arm optical waveguide are coupled to the input optical waveguide. Thus, light input to the optical modulator will propagate through the first arm optical waveguide and the second arm optical waveguide. Output ends of the first arm optical waveguide and the second arm optical waveguide are coupled to the output optical waveguide. Thus, output light of the first arm optical waveguide and output light of the second arm optical waveguide are combined and then output. Note that the first arm optical waveguide and the second arm optical waveguide may each be hereinafter referred to as an "arm waveguide."

The arm waveguides are provided with electrodes S1-S4. Each of the electrodes S1-S4 is supplied with an electric signal indicating transmission data. In this example, each symbol carries four bits of data. Accordingly, data or an electric signal supplied for one symbol is represented hereinafter using "b0-b3," as depicted in FIG. 2B, where b0 is a least significant bit (LSB), and b3 is a most significant bit (MSB). Meanwhile, transmission data b0-b3 are generated by a DSP.

Signals b0-b3 are supplied to corresponding electrodes S1-S4 via digital drivers. In this case, the refractive indexes of the arm waveguides change in accordance with the values of the signals b0-b3. When the refractive index of the arm waveguide changes, the phase of light passing through this arm waveguide changes. Thus, the electrodes S1-S4 function as phase shifters. Meanwhile, the signals b0-b3 are applied as differential signals to the first and second arm waveguides.

In this example, the length of the electrode S2 is twice that of the electrode S1, the length of the electrode S3 is twice that of the electrode S2, and the length of the electrode S4 is twice that of the electrode S3. Hence, a phase shift implemented by the signal b1 supplied to the electrode S2 is about twice as great as a phase shift implemented by the signal b0 supplied to the electrode S1. Similarly, a phase shift implemented by the signal b2 supplied to the electrode S3 is about twice as great as the phase shift implemented by the signal b1 supplied to the electrode S2. A phase shift implemented by the signal b3 supplied to the electrode S4 is about twice as great as the phase shift implemented by the signal b2 supplied to the electrode S3.

In this example, the intensity of output light of the Mach-Zehnder interferometer is proportional to the phase shifts in the arm waveguides. Accordingly, the intensity of output light of the Mach-Zehnder interferometer is controlled by the signals b0-b3.

Assume that the amplitude of the intensity of output light controlled by the signal b0 is "1." In this case, the amplitudes of the intensities of output light controlled by the signals b1, b2, and b3 are respectively "2," "4," and "8." Accordingly, for example, when the bits b0-b3 are "1010," the intensity of output light of the Mach-Zehnder interferometer is "5 (=1+0+4+0)"; and when the bits b0-b3 are "1101," the intensity of output light of the Mach-Zehnder interferometer is "11 (=1+2+0+8)." Thus, 16PAM is implemented in accordance with the bits b0-b3.

An electrode to which an electric signal indicating transmission data is supplied (i.e., an electrode used as a phase shifter) may hereinafter be referred to as a "segment." Thus, the optical modulator depicted in FIGS. 2A-2C includes segments S1-S4.

The optical modulator controls, as described above, the phase of input light according to the signals b0-b3 so as to generate an optical signal indicating transmission data. However, the quality of the optical signal (output optical signal) will be decreased if the timings of the signals b0-b3 supplied to the segments are not appropriately adjusted. For example, the waveform of the optical signal (output optical signal) could lose accuracy if the timings of the signals b0-b3 supplied to the segments are not appropriately adjusted. Accordingly, the optical modulator includes, as depicted in FIG. 2B, delay elements τ1-τ3 to appropriately adjust the timings of the signals b0-b3 supplied to the segments. The delay elements τ1-τ3 respectively delay the signals b1-b3.

To enhance the quality of the optical signal, the timings of the signals b0-b3 are preferably adjusted to satisfy the following conditions.

(1) The difference between the timing at which the signal b0 arrives at the segment S1 and the timing at which the signal b1 arrives at the segment S2 is the "time required for light to propagate from the input end of the segment S1 to the input end of the segment S2 (hereinafter, "propagation time S1_S2")".

(2) The difference between the timing at which the signal b0 arrives at the segment S1 and the timing at which the signal b2 arrives at the segment S3 is the "time required for light to propagate from the input end of the segment S1 to the input end of the segment S3 (hereinafter, "propagation time S1_S3")".

(3) The difference between the timing at which the signal b0 arrives at the segment S1 and the timing at which the signal b3 arrives at the segment S4 is the "time required for light to propagate from the input end of the segment S1 to the input end of the segment S4 (hereinafter, "propagation time S1_S4")".

Assume, for example, that the lengths of the segments S1, S2, S3, and S4 are respectively "L (100 μm)," "2L (200 μm)," "4L (400 μm)," and "8L (800 μm)," as depicted μn FIG. 2C. The gaps between the segments are each "L (50 μm)," and the optical waveguides have a group refractive index Ng of 4.3. C indicates the velocity of light in a vacuum. In this case, the propagation times are calculated as follows.

Propagation time $S1\_S2=(L+Lg)\times Ng/c$ (2.15 ps)

Propagation time $S1\_S3=(3L+2Lg)\times Ng/c$ (5.73 ps)

Propagation time $S1\_S1=(7L+3Lg)\times Ng/c$ (12.2 ps)

Setting the delay times of the delay elements τ1, τ2, and τ3 respectively for the propagation times S1_S2, S1_S3, and S1_S4 satisfies the conditions (1)-(3), thereby improving the quality of the optical signal. However, in this case, the delay elements τ, τ2, and τ3 each need to be differently controlled since the delay elements τ, τ2, and τ3 have different circuit configurations. For example, when the delay times of the delay elements are dependent on temperature, the delay elements may each need to be differently controlled with respect to a temperature change. Accordingly, the optical modulator in accordance with embodiments of the invention has a configuration for solving or alleviating this problem.

Bit multiplexing based on the optical DAC scheme may be implemented by various configurations. In the configuration depicted in FIG. 3A, bit multiplexing is implemented by varying the lengths of segments. In particular, segments for a low-order bit are formed to be short, and segments for a high-order bit are formed to be long. In this example, the bit b0 is the LSB, and the bit b2 is the MSB. In this case, the length of the segment S2 is twice that of the segment S1, and the length of the segment S3 is twice that of the segment S2.

Figure 3A:
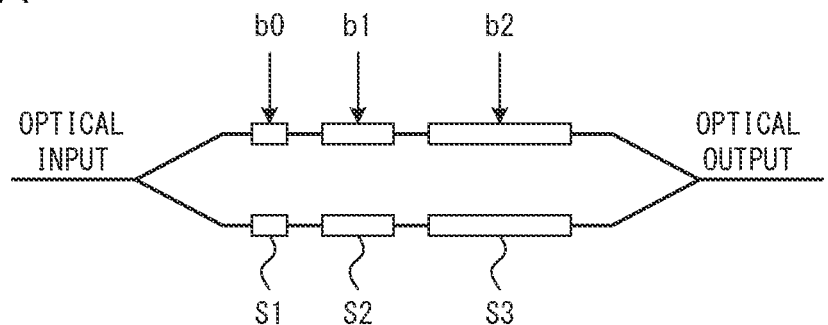
FIGS. 3A-3C illustrate examples of segment configurations for implementing bit multiplexing.
Figure 3B:
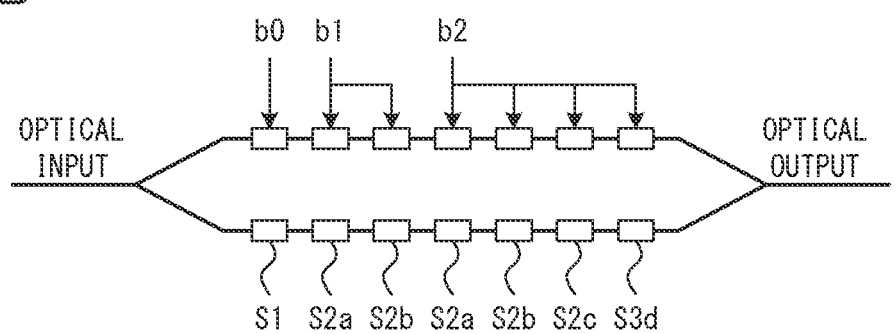

In the configuration depicted in FIG. 3B, bit multiplexing is implemented by varying segment counts (the number of segments). In particular, the number of segments provided for low-order bits is small, and the number of segments provided for high-order bits is large. In this example, one segment (S1) is provided for the bit b0, two segments (S2a, S2b) are provided for the bit b1, and four segments (S3a-S3d) are provided for the bit b2. Note that the lengths of the segments are the same. The configurations depicted in FIGS. 3A and 3B can be combined.

Figure 3C:
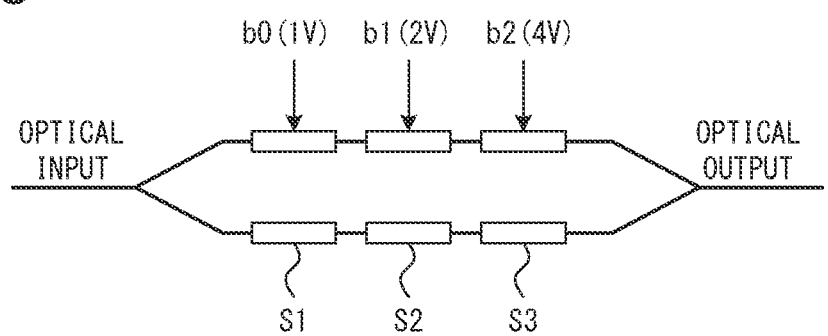

In the configuration depicted in FIG. 3C, bit multiplexing is implemented by varying the voltage of electric signals applied to the segments. In particular, the voltage of a signal applied to a segment corresponding to a low-order bit is low, and the voltage of a signal applied to a segment corresponding to a high-order bit is high. In this example, the voltage applied to the segment S1 is 1 V, the voltage applied to the segment S2 is 2 V, and the voltage applied to the segment S3 is 4 V. The configurations depicted in FIGS. 3A-3C can be optionally combined.

EMBODIMENTS

Figure 4:
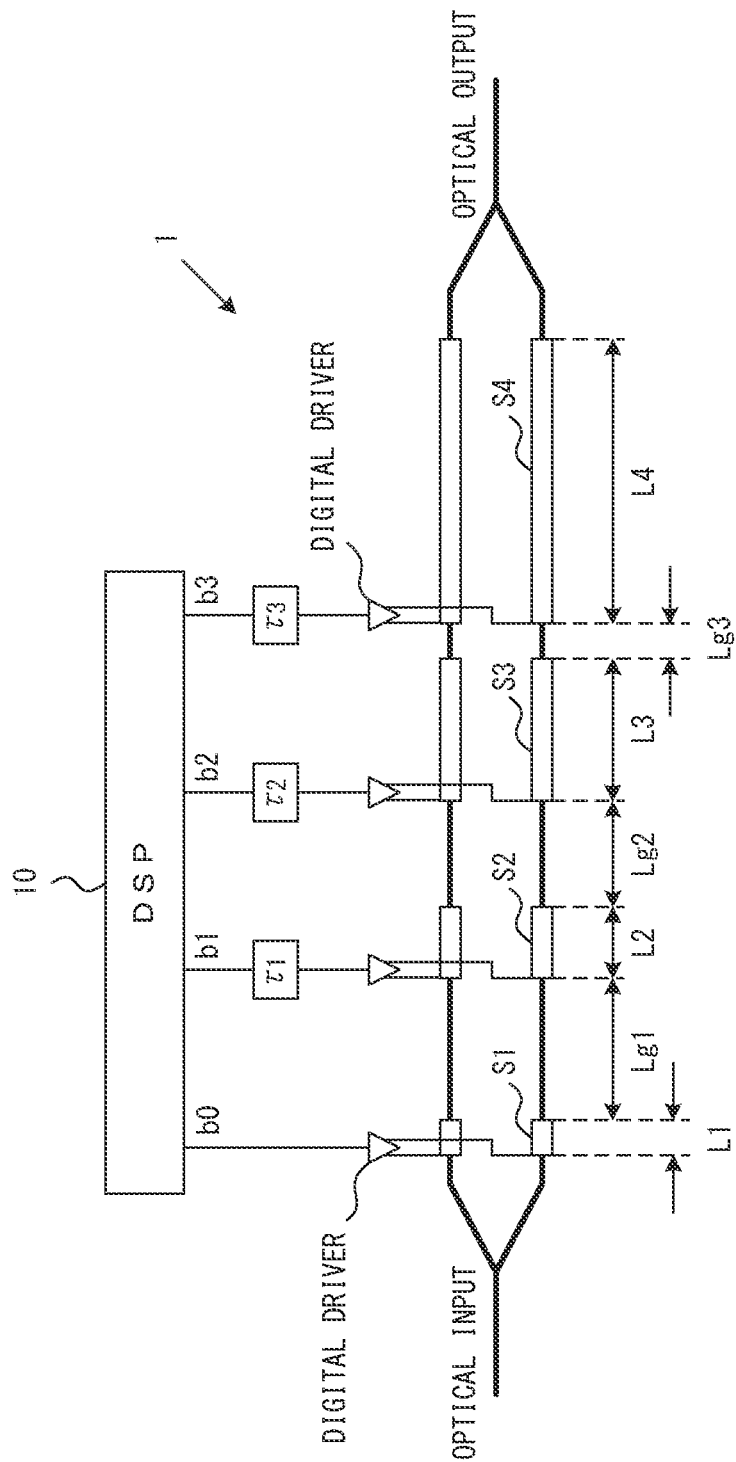
FIG. 4 illustrates an example of an optical modulator in accordance with embodiments of the invention.

FIG. 4 illustrates an example of an optical modulator in accordance with embodiments of the invention. As described above by referring to FIG. 2A, an optical modulator 1 in accordance with embodiments of the invention includes a Mach-Zehnder interferometer. The Mach-Zehnder interferometer includes an input optical waveguide, a first arm optical waveguide, a second arm optical waveguide, and an output optical waveguide. Segments S1-S4 are provided for each of the arm waveguides. Each of the segments S1-S4 corresponds to an electrode to which an electric signal is applied.

A DSP 10 generates transmission data. In this example, each symbol carries four bits of data. Thus, the DSP 10 generates transmission data b0-b3 for each symbol. Transmission data b0-b3 are respectively supplied to corresponding segments S1-S4 via digital drivers. However, transmission data b1-b3 are respectively delayed by delay elements τ1-τ3. The configurations and delay times of the delay elements τ1-τ3 are described hereinafter.

Output signals of the digital drivers are supplied to the corresponding segments S1-S4. In this example, each signal is applied to the input ends of corresponding segments (i.e., electrodes). In particular, a signal b0 indicating bit b0 is applied to the input ends of the segments S1. Similarly, a signal b1 is applied to the input ends of the segments S2, a signal b2 is applied to the input ends of the segments S3, and a signal b3 is applied to the input ends of the segments S4. Note that an "input end" includes the vicinity of an input end.

The lengths of the segments S1-S4 are different. In particular, the length L2 of the segment S2 is twice the length L1 of the segment S1. The length L3 of the segment S3 is twice the length L2 of the segment S2. The length L4 of the segment S4 is twice the length L3 of the segment S3. The gaps between the segments are determined to satisfy the following formula (1).

$$L1\times Ns+Lg1\times Np=L2\times Ns+Lg2\times Np=L3\times Ns+Lg3\times Np \quad (1)$$

In this formula, Lg1 indicates the gap between the segments S1 and S2, Lg2 indicates the gap between the segments S2 and S3, and Lg3 indicates the gap between the segments S3 and S4. Np indicates a group refractive index that the optical waveguides have in regions in which no electrodes are provided. Ns indicates a group refractive index that the optical waveguides have in regions in which electrodes are provided (i.e., segment regions). For example, the arm waveguides may have a cross section having, but not particularly limited to, a rectangular shape. However, portions of the arm waveguides in regions in which electrodes are provided (i.e., segment regions) form rib waveguides. In this case, the refractive index Ns that the optical waveguides have in segment regions may be different from the refractive index Np that the optical waveguides have in regions in which no electrodes are provided.

When the group refractive index Np and the group refractive index Ns are the same, formula (1) is simplified as indicated by the following formula (2).

$$L1+Lg1=L2+Lg2=L3+Lg3 \quad (2)$$

Formula (1), which represents a case in which the optical modulator includes four segments, may be generalized down to formula (3).

$$Li\times Ns+Lgi\times Np=\text{Specified constant} \quad (3)$$

In formula (3), "Li×Ns" indicates an optical path length for light passing through a segment region Si. i is a variable for identifying each segment. In the configuration depicted in FIG. 4, i is 1, 2, or 3. "Lgi×Np" indicates the optical path length of the gap section between a segment Si and a segment Si+1. Thus, "Li×Ns+Lgi×Np" indicates the optical path length from the input end of a segment Si to the input end of a segment Si+1. Hence, formula (3) indicates that the optical path lengths from the input ends of respective segments to the input ends of corresponding next segments are the same.

The optical path length from the input end of a certain segment to the input end of the next segment may hereinafter be referred to as a "base optical path length." In embodiments of the invention, the base optical path lengths of the segments are equal. The light propagation delay for the portion from the input end of a certain segment to the input end of the next segment is obtained by dividing the base optical path length by the light velocity. A result of this division (i.e., propagation delay) may hereinafter be referred to as a "base delay τ0."

In the meantime, to enhance the quality of an optical signal generated by the optical modulator 1, the timings of the signals b0-b3 are preferably adjusted, as indicated above, to satisfy the following conditions.

(1) The difference between the timing at which the signal b0 arrives at the segment S1 and the timing at which the signal b1 arrives at the segment S2 is the "time required for light to propagate from the input end of the segment S1 to the input end of the segment S2 (hereinafter, "propagation time S1_S2")".
(2) The difference between the timing at which the signal b0 arrives at the segment S1 and the timing at which the signal b2 arrives at the segment S3 is the "time required for light to propagate from the input end of the segment S1 to the input end of the segment S3 (hereinafter, "propagation time S1_S3")".
(3) The difference between the timing at which the signal b0 arrives at the segment S1 and the timing at which the signal b3 arrives at the segment S4 is the "time required for light to propagate from the input end of the segment S1 to the input end of the segment S4 (hereinafter, "propagation time S1_S4")".

In the configuration depicted in FIG. 4, the propagation time S1_S2 (the time required for light to propagate from the input end of the segment S1 to the input end of the segment S2) is "τ0." Meanwhile, since the segments S1-S4 are formed to satisfy formula (1) through (3), the propagation time S1_S3 (the time required for light to propagate from the input end of the segment S1 to the input end of the segment S3) is "2×τ0." In addition, the propagation time S1_S4 (the time required for light to propagate from the input end of the segment S1 to the input end of the segment S4) is "3×τ0."

Accordingly, the optical modulator 1 depicted in FIG. 4 is such that the delay time of the delay element τ1 is set to "τ0," the delay time of the delay element τ2 is set to "2×τ0," and the delay time of the delay element τ3 is set to "3×τ0." This example is based on the assumption that in the absence of the delay elements τ1-τ3, the propagation times of the signals b0-b3 for the sections between the DSP 10 and the Mach-Zehnder interferometer are the same. That is, it is assumed that the signals b0-b3 have a skew of zero from the DSP 10 to the Mach-Zehnder interferometer.

As described above, the delay times of the delay elements τ1, τ2, and τ3 in the optical modulator 1 are each an integral multiple of the base delay τ0. Hence, the delay elements τ1-τ3 may each be implemented by one or more delay elements τ0. Note that a "delay element τ0" indicates a delay element having a delay time of τ0.

Figure 5:
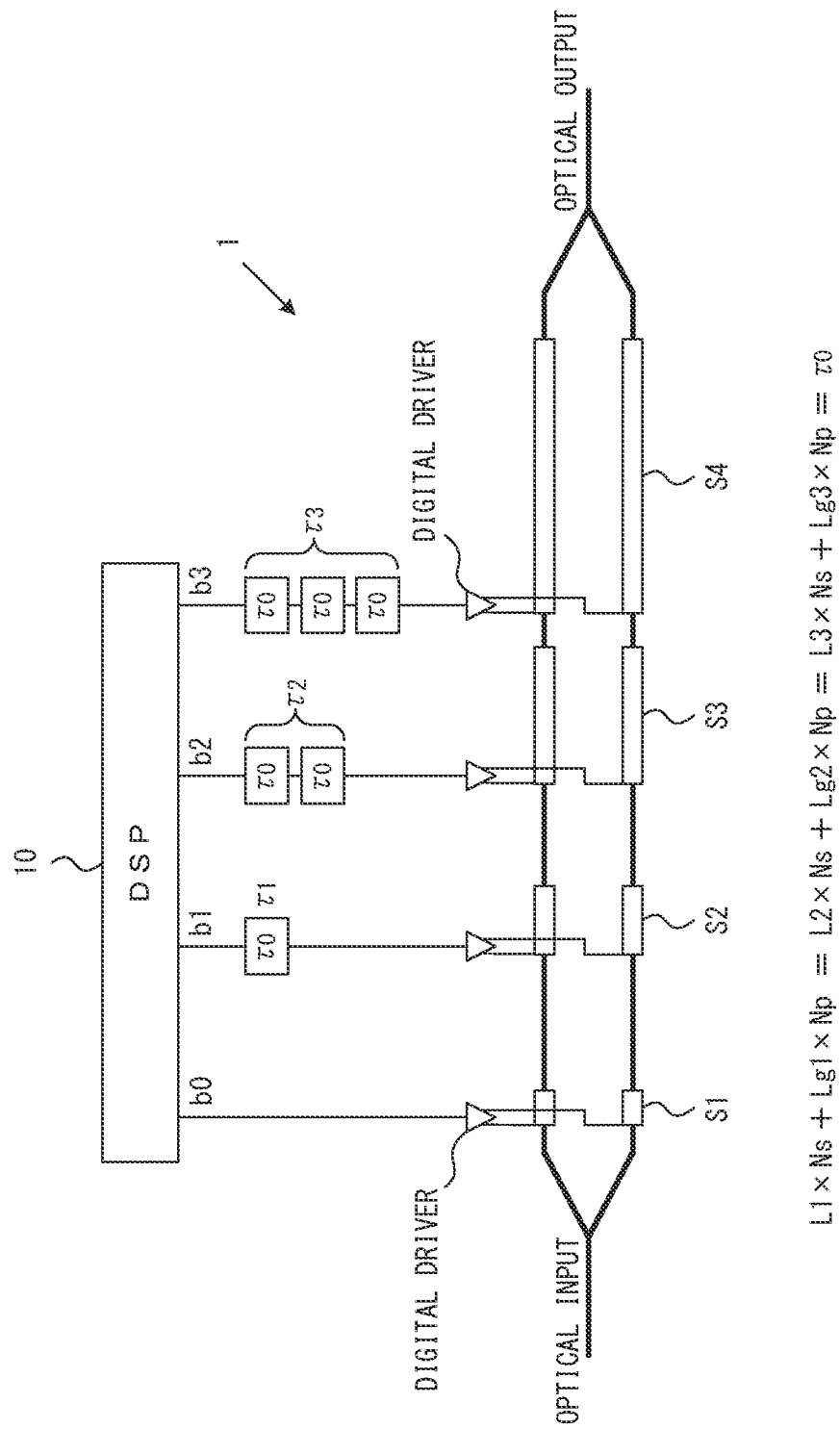
FIG. 5 illustrates an example of an optical modulator that includes a delay adjustment circuit for directly delaying a data signal.

Specifically, the delay element τ1 that delays the signal b1 is implemented by one delay element τ0, as depicted in FIG. 5. The delay element τ2 that delays the signal b2 is implemented by connecting two delay elements τ0 in series. The delay element τ3 that delays the signal b3 is implemented by connecting three delay elements τ0 in series. Accordingly, since all of the delay elements have the same configuration, the delay times can be controlled more easily than in the configuration depicted in FIGS. 2A-2C in which a plurality of types of delay elements are provided. Assume, for example, that the delay times of the delay elements are dependent on temperature. In this case, the delay times of all of the delay elements in the configurations depicted in FIGS. 4-5 can be appropriately adjusted in accordance with a temperature change by using the same control method.

Although the signals b1-b3 in the example depicted in FIG. 5 are directly delayed by delay elements, embodiments of the invention are not limited to this configuration. In the example depicted in FIG. 6, signals b0-b3 are respectively guided to a Mach-Zehnder interferometer via corresponding flip-flop circuits FF0-FF3. In this case, each of the flip-flop circuits FF0-FF3 temporarily holds an input signal and outputs this signal in synchrony with a clock signal. Hence, the timings of the signals b0-b3 can be adjusted by controlling the timing of a clock signal supplied to the flip-flop circuits FF0-FF3.

Figure 6:
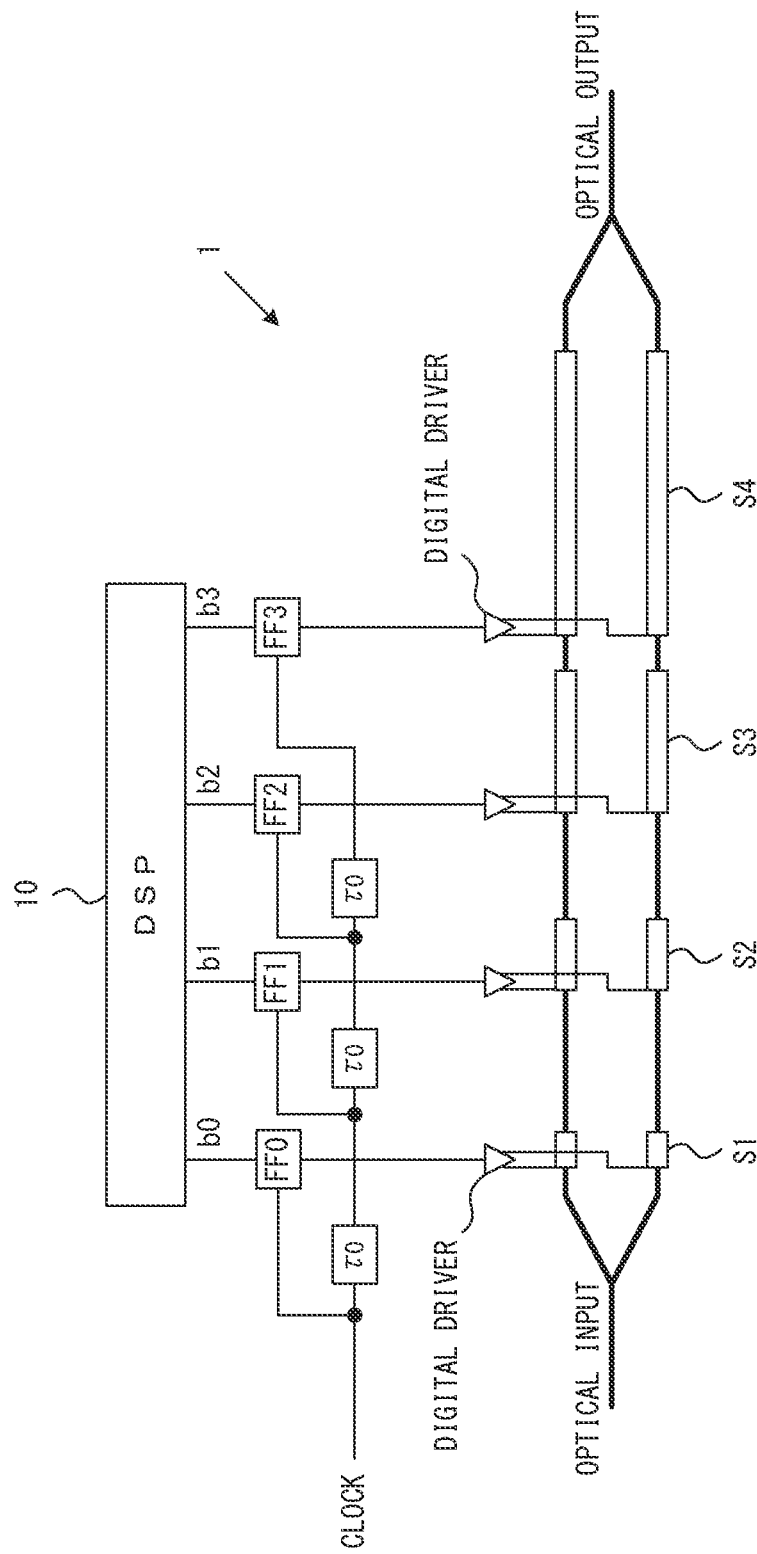
FIG. 6 illustrates an example of an optical modulator that includes a delay adjustment circuit for delaying a data signal by using a clock signal.

In particular, a clock signal is supplied to the flip-flop circuit FF0, supplied to the flip-flop circuit FF1 via one delay element τ0, supplied to the flip-flop circuit FF2 via two delay elements τ0, and supplied to the flip-flop circuit FF3 via three delay elements τ0. Thus, the signals b1, b2, and b3 are respectively delayed by "τ0," "2×τ0," and "3×τ0" with respect to the signal b0. Accordingly, the timings at which the signals b0-b3 arrive at the Mach-Zehnder interferometer in the configuration depicted in FIG. 6 are substantially the same as those in FIG. 5. This example is also based on the assumption that in the absence of the delay elements τ1-τ3 and the flip-flop circuits FF0-FF3, the propagation times of the signals b0-b3 for the sections between the DSP 10 and the Mach-Zehnder interferometer are the same. That is, it is assumed that the signals b0-b3 have a skew of zero from the DSP 10 to the Mach-Zehnder interferometer.

Figure 7A:
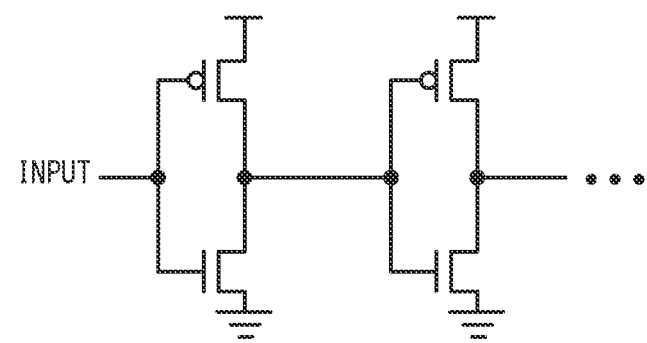
FIGS. 7A and 7B illustrate examples of delay elements.
Figure 7B:
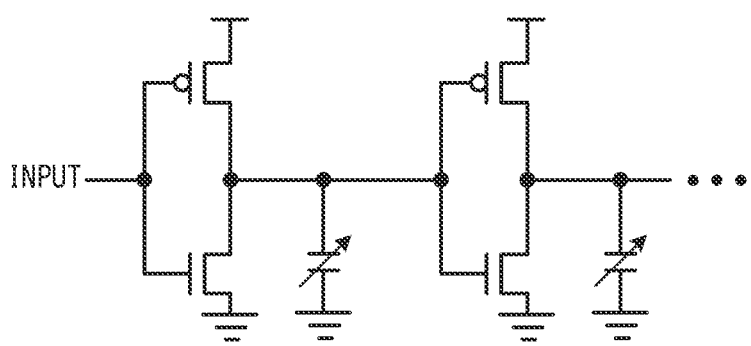

FIGS. 7A and 7B illustrate examples of delay elements. For example, the delay element τ0 may be implemented by an inverter circuit, but the invention is not particularly limited to this. In the example depicted in FIG. 7A, the delay element τ0 is implemented by two inverter circuits connected in series. For example, each of the inverter circuits may be formed from a pair of transistors provided between a DC power supply and a ground. In this case, the inverter circuit will be formed from one nMOS transistor and one pMOS transistor. In the configuration illustrated in FIG. 5, the signals b0-b3 are respectively input to the circuit depicted in FIG. 7A. In the configuration illustrated in FIG. 6, a clock signal is input to the circuit depicted in FIG. 7A.

A plurality of components each constituted by the circuit depicted in FIG. 7A may be provided in series so as to implement needed delay times. Assume, for example, that the delay element τ0 needs to have a delay time of 10 ps and the circuit depicted in FIG. 7A or 7B has a delay time of 5 ps. In this case, the delay element τ0 is implemented by connecting two components each constituted by the circuit depicted in FIG. 7A in series.

The delay element τ0 is not limited to the circuit depicted in FIG. 7A. For example, as depicted in FIG. 7B, signal lines between inverter circuits may be connected to grounds via variable capacitance capacitors. In this case, the inclination of the rising edge or the falling edge of an output signal of the inverter circuit on a preceding stage is reduced. Then, the inverter circuit on the subsequent stage recovers the rising edge or the falling edge. In this case, a delay corresponding to the capacitance of the capacitor is generated.

As described above, the optical modulator in accordance with embodiments of the invention is such that the plurality of delay elements for adjusting the timings of the electric signals b0-b3 to be used as drive signals for the optical modulator are implemented by circuits having the same configuration. Thus, when, for example, the ambient temperature changes, the delay times of the plurality of delay elements can be collectively adjusted. For example, according to the configuration depicted in FIG. 7A, the delay times of all of the delay elements τ0 can be equally adjusted by adjusting the voltages of the DC power supplies. According to the configuration depicted in FIG. 7B, the delay times of all of the delay elements τ0 can be equally adjusted by controlling the capacitances of the capacitors. The capacitances of the variable capacitance capacitors are adjusted by controlling a current or a voltage.

FIGS. 8A and 8B illustrate variations of segment configurations. FIG. 8A depicts a structure in which weights are assigned according to segment lengths (FIG. 3A). FIG. 8B depicts a configuration in which weights are assigned according to segment lengths and segment counts (the combination of FIGS. 3A and 3B). In the configuration depicted in FIG. 8A, one segment is provided for each bit of transmission data. For example, the optical modulators depicted in FIGS. 4-6 may be examples of the configuration illustrated in FIG. 8A.

In the configuration depicted in FIG. 8A, bit multiplexing is implemented by varying the lengths of segments. In particular, short segments are provided for low-order bits, and long segments are provided for high-order bits. Specifically, the length of a segment corresponding to an i-th bit is twice the length of a segment corresponding to an (i−1)-th bit. In other words, the length of a segment corresponding to a bit i (i=1 to n−1) is "$2^i \times L$," where the length of a segment corresponding to the bit 0 (i.e., LSB) is "L." Accordingly, for example, the length of the segment corresponding to the bit b1 may be twice the length of the segment corresponding to the bit b0, and the length of the segment corresponding to the bit b2 may be twice the length of the segment corresponding to the bit b1. As indicated by formulae (1) and (3), the gaps between the segments are determined such that the optical path lengths from the input ends of respective segments to the input ends of next segments are equal. Thus, the gap on the output side of a short segment will be large, and the gap on the output side of a long segment will be small.

In the configuration depicted in FIG. 8B, bit multiplexing is implemented by varying segment counts. However, in the example depicted in FIG. 8B, the scheme of varying segment lengths is adapted to the bits 0 to m−1, and the scheme of varying segment counts is adapted to the bits m to n−1. In particular, segments S1 to Sm having different lengths are provided for the bits 0 to m−1. By contrast, a plurality of segments are provided for each of the bits m to n−1. In particular, a phase shifter corresponding to a bit j (j=m to n−1) is formed from $2^{j-m+1}$ segments. For example, the phase shifter corresponding to the bit m is formed from two segments, and the phase shifter corresponding to the bit n−1 is formed from $2^{n-m}$ segments.

In the configuration depicted in FIG. 8B, the segments corresponding to the bit m and the following bits are the same in length. In the example depicted in FIG. 8B, the length of each of the segments forming phase shifters provided for the bits m to n−1 is the same as the length of the segment Sm.

The gaps between the segments in the configuration depicted in FIG. 8B are also determined to satisfy formula (1) or (3). In this regard, the segments corresponding to the bit m and the following bits are the same in length. Hence, the gaps are also the same in size. In particular, the size of each of the gaps in the configuration for the bit m and the following bits in FIG. 8B is the same as the size of the gap between the segment Sm and the next segment.

In addition, when this configuration is arranged to provide a plurality of segments for each bit, the same signal will be supplied to the plurality of segments. However, the timings of a plurality of signals supplied to a plurality of segments are adjusted in consideration of light propagation times.

In comparison with this configuration, the configuration depicted in FIG. 8A has a small segment count and thus includes a decreased number of circuit elements (flip-flop circuits FF, delay elements τ0, digital drivers). However, when the configuration depicted in FIG. 8A is arranged to cause each symbol to carry an increased number of bits of data, the segment length corresponding to the MSB will increase. An increase in the segment length could disable a drive signal from acting equally on the entirety of the segment. Thus, in a case where each symbol carries many bits of data, a phase shifter corresponding to the MSB or a bit close to the MSB may preferably be formed from a plurality of segments (as the configuration depicted in FIG. 8B).

Figure 9:
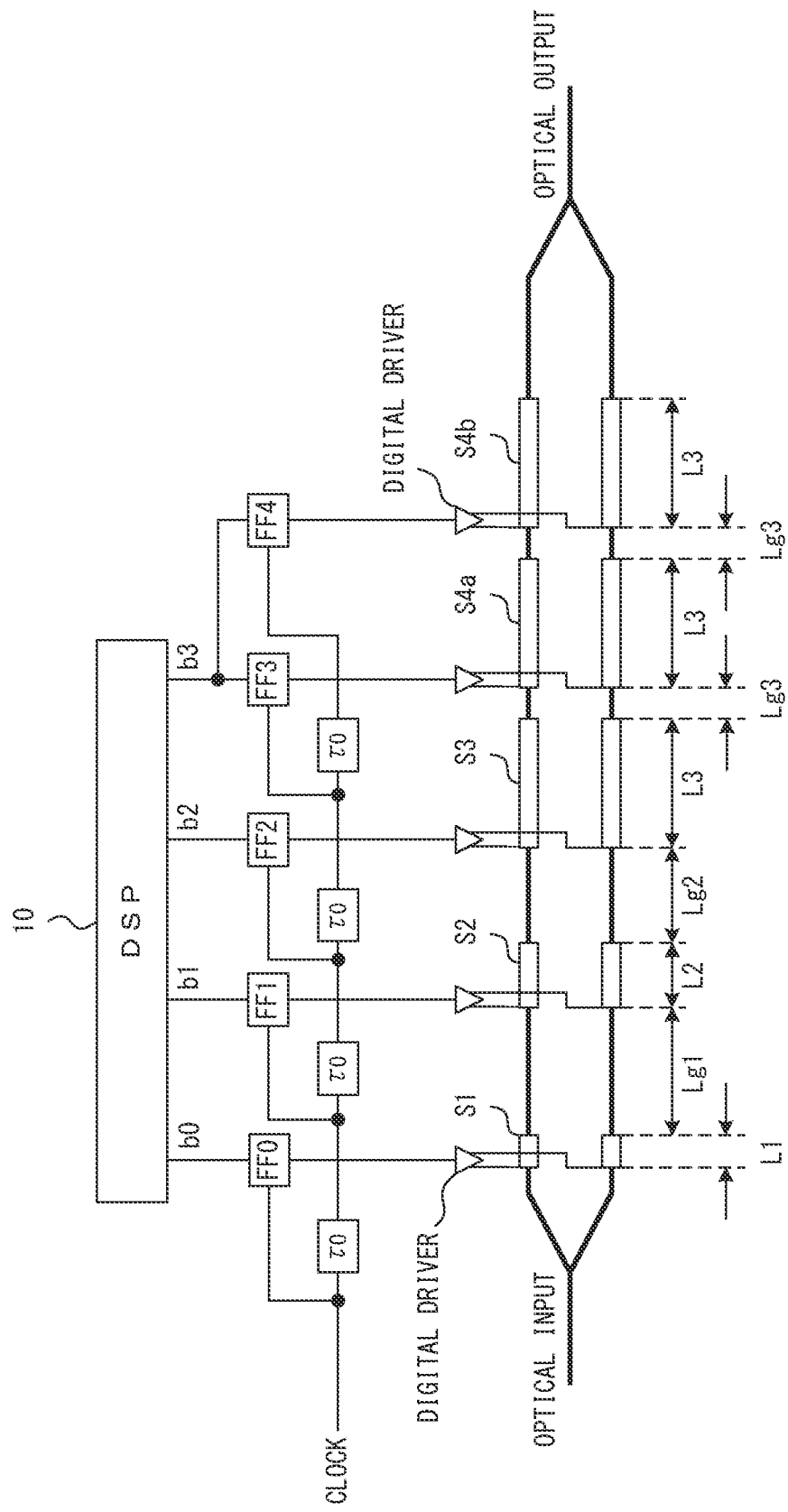
FIG. 9 illustrates an example of an optical modulator wherein weighting based on segment lengths and weighting based on segment counts are combined.

FIG. 9 illustrates an example of an optical modulator wherein weighting based on segment lengths and weighting based on segment counts are combined. The optical modulator depicted in FIG. 9 can generate an optical signal equivalent to that generated by the optical modulator indicated in FIG. 6. However, in the configuration depicted in FIG. 9, the segment S4 depicted in FIG. 6 is not provided, and instead, two segments S4a and S4b are provided. Thus, the segments S4a and S4b are provided for the bit b3. The length of each of the segments S4a and S4b is the same as that of the segment S3. Hence, the sum of the lengths of the segments S4a and S4b is twice the length of the segment S3. The size of the gap between the segments S4a and S4b is the same as the size of the gap between the segments S3 and S4a. A signal representing the bit b3 is supplied to the segments S4a and S4b via the flip-flop circuits FF3 and FF4.

The time required for light to propagate from the input end of the segment S4a to the input end of the segment S4b via the arm waveguide is the same as the time required for light to propagate from the input end of the segment S3 to the input end of the segment S4a via the arm waveguide. Thus, the difference between the timing of the signal b3 supplied to the segment S4a via the flip-flop circuit FF3 and the timing of the signal b3 supplied to the segment S4b via the flip-flop circuit FF4 needs to be the same as the difference between the timing of the signal b2 supplied to the segment S3 via the flip-flop circuit FF2 and the timing of the signal b3 supplied to the segment S4a via the flip-flop circuit FF3. Hence, the difference between the timing of a clock signal supplied to the flip-flop circuit FF3 and the timing of a clock signal supplied to the flip-flop circuit FF4 is τ0.

In the examples described above, the segment corresponding to the LSB, the following segments, and the segment corresponding to the MSB are arranged in this order in the direction of light propagation. However, embodiments of the invention are not limited to this configuration. In particular, the segments corresponding to the bits can be arranged in any order. For example, the segment corresponding to the MSB, the following segments, and the segment corresponding to the LSB may be arranged in this order in the direction of light propagation.

A signal generated by the DSP 10 is supplied to a corresponding segment. However, the quality of an optical signal in an optical modulator of a lumped-constant type may be dependent on a position on a segment at which an electric signal is supplied. Specifically, the quality of the optical signal is increased when an electric signal is supplied to the input end of a segment. Note that an "input end" includes the vicinity of an input end.

FIGS. 10A and 10B illustrate relationships between segment lengths and optical responses. The horizontal axis indicates the frequency of an electric signal supplied to a segment. FIG. 10A indicates optical responses provided when an electric signal is supplied to the input end of a segment. FIG. 10B indicates optical responses provided when an electric signal is supplied to the output end of a segment. When an electric signal is supplied to the input end of a segment, light and the electric signal propagate in the same direction in the segment. When an electric signal is supplied to the output end of a segment, light and the electric signal propagate in opposite directions in the segment.

As depicted in FIGS. 10A and 10B, for a short segment, the optical response is not dependent on the position very much at which an electric signal is applied. By contrast, for a long segment, the optical response is strongly dependent on the position at which an electric signal is applied. In particular, for a segment length of 0.5-1 mm, the optical response is worse in a case where an electric signal is applied to the output end than in a case where the electric signal is applied to the input end. Hence, an electric signal to be used as a drive signal for the optical modulator is preferably supplied to the input ends of the segments.

FIG. 11 illustrates a configuration example of waveguides and electrodes in an optical modulator. represents a signal pad, and G represents a ground pad. A hatched region indicates an electrode (i.e., a segment).

The length of the electrode of a segment S2 is twice the length of the electrode of a segment S1. The length of the electrode of a segment S3 is twice the length of the electrode of the segment S2. The lengths of the electrodes of the segments S3, S4a, and S4b are the same. The gaps between the electrodes are determined to satisfy formula (1) or (3). In particular, the gaps are set such that the optical path lengths from the input ends of respective electrodes to the input ends of next electrodes are equal.

Signal pads S are disposed in the vicinities of the input ends of corresponding electrodes. The signal pads S of the segments S1-S4b are preferably arranged at equal spacing. The signal pads S are electrically connected to corresponding electrodes by a material having a high conductivity. Ground pads G are also electrically connected to corresponding electrodes by a material having a high conductivity. For example, each of the pads may be electrically connected to a signal wiring pattern or a ground pattern by flip-chip bonding.

Figure 12A:
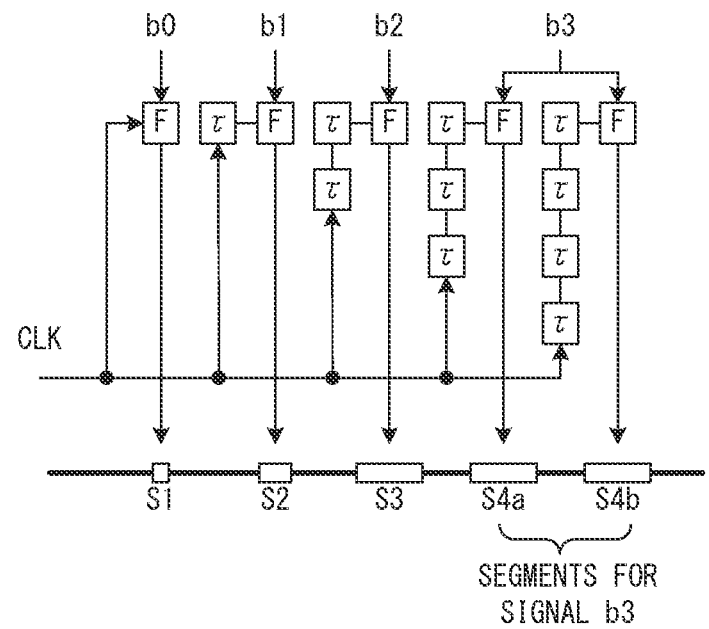
FIGS. 12A and 12B illustrate configuration examples of a delay adjustment circuit in an optical modulator.
Figure 12B:
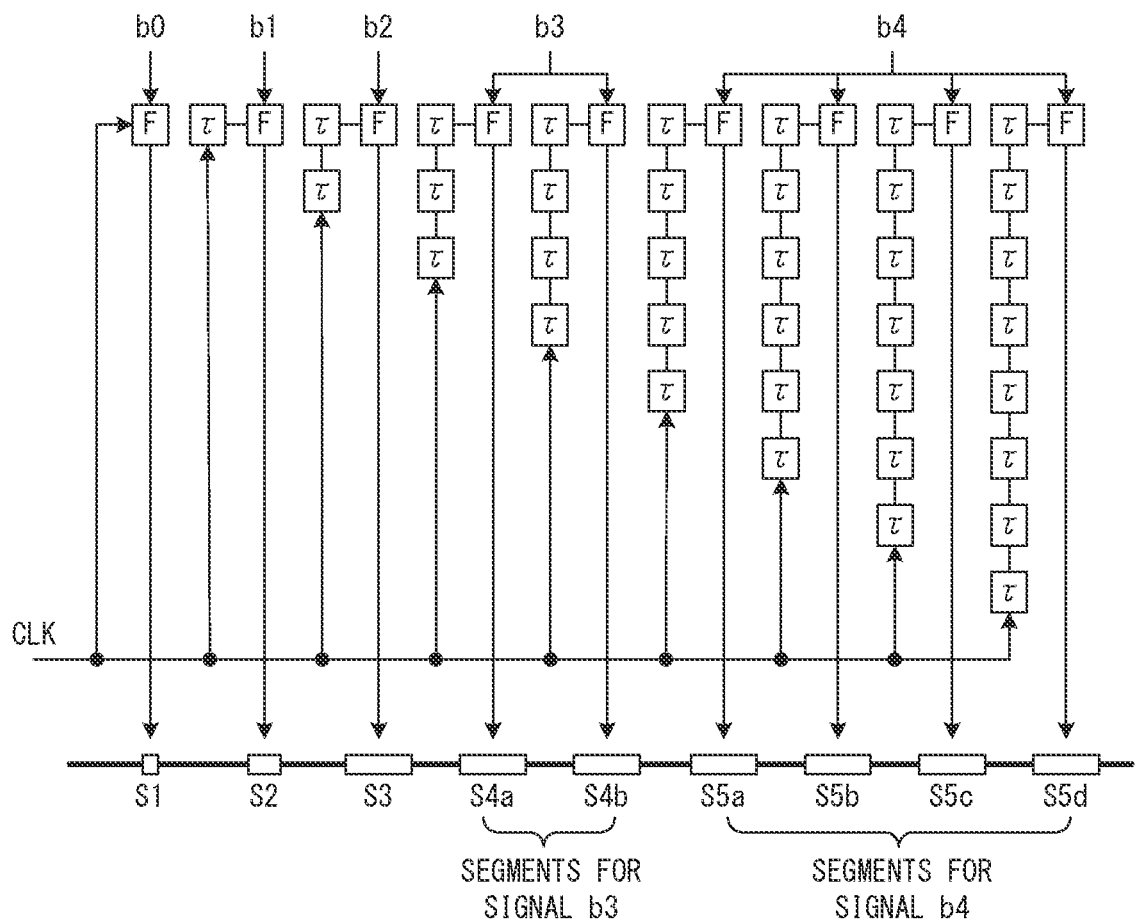

FIGS. 12A and 12B illustrate configuration examples of a delay adjustment circuit in an optical modulator. In the configurations depicted in FIGS. 12A and 12B, electric signals to be used as drive signals for the optical modulator are supplied to corresponding segments via flip-flop circuits F. The timing of each of the electric signals is adjusted by delaying a clock signal CLK to be input to a corresponding flip-flop circuit F. The optical modulator depicted in FIG. 12A generates optical signals for carrying four bits of transmission data b0-b3. A signal b1 is supplied to a segment S2, a signal b2 is supplied to a segment S3, and a signal b3 is supplied to segments S4a and S4b. The optical modulator depicted in FIG. 12B generates optical signals for carrying five bits of transmission data b0-b4. A signal b1 is supplied to a segment S2, a signal b2 is supplied to a segment S3, a signal b3 is supplied to segments S4a and S4b, and a signal b4 is supplied to segments S5a-S5d.

As in the cases depicted in FIGS. 9 and 11, the length of the segment S2 is twice that of the segment S1, and the length of the segment S3 is twice that of the segment S2. The length of each of the segments S4a and S4b is the same as that of the segment S3. In addition, in the case depicted in FIG. 12B, the length of each of the segments S5a-S5d is the same as that of the segment S3.

The gaps between the segments are set to satisfy formula (1) or (3) such that the optical path lengths from the input ends of respective segments to the input ends of next segments are equal. Hence, the delay time for a signal supplied to each segment is expressed as an integral multiple of a base delay $\tau 0$. Thus, the delay time for a signal supplied to each segment is implemented by one or more delay elements $\tau$. The delay time of a delay element $\tau$ is the base delay $\tau 0$. In particular, when a clock signal CLK is input to a flip-flop circuit F corresponding to the segment S1, a clock signal CLK will be input to a flip-flop circuit F corresponding to the segment S2 via one delay element $\tau$, a clock signal CLK will be input to a flip-flop circuit F corresponding to the segment S3 via two delay elements $\tau$, a clock signal CLK will be input to a flip-flop circuit F corresponding to the segment S4a via three delay elements $\tau$, and a clock signal CLK will be input to a flip-flop circuit F corresponding to the segment S4b via four delay elements $\tau$. Furthermore, in the case depicted in FIG. 12B, a clock signal CLK will be input to a flip-flop circuit F corresponding to the segment S5a via five delay elements $\tau$, a clock signal CLK will be input to a flip-flop circuit F corresponding to the segment S5b via six delay elements $\tau$, a clock signal CLK will be input to a flip-flop circuit F corresponding to the segment S5c via seven delay elements $\tau$, and a clock signal CLK will be input to a flip-flop circuit F corresponding to the segment S5d via eight delay elements $\tau$.

FIGS. 13A and 13B illustrate other configuration examples of a delay adjustment circuit in an optical modulator. Note that the configurations of the segments in FIGS. 12A and 13A are the same and the configurations of the segments in FIGS. 12B and 13B are the same.

In the cases depicted in FIGS. 13A and 13B, a clock signal CLK passes through a plurality of delay elements $\tau$ connected in series. When a clock signal CLK is input to a flip-flop circuit F corresponding to a segment S1 without passing through a delay element, an output signal of a first delay element $\tau$ will be input to a flip-flop circuit F corresponding to a segment S2, and an output signal of a second delay element $\tau$ will be input to a flip-flop circuit F corresponding to a segment S3. Similarly, an output signal of an i-th delay element $\tau$ will be input to a flip-flop circuit corresponding to an (i+1)-th segment. This configuration has fewer number of delay elements $\tau$ than the configurations depicted in FIGS. 12A and 12B.

In a case where an electric signal indicating transmission data is split by a digital driver DR, buffer amplifiers BA for compensating for a delay time that occurs at the digital driver DR are provided as depicted in FIGS. 13A and 13B. In this configuration, the path lengths of electric signals are equal. The digital drivers DR and the buffer amplifiers BA are preferably designed such that the voltages of bits applied to the segments are equal.

Figure 14A:
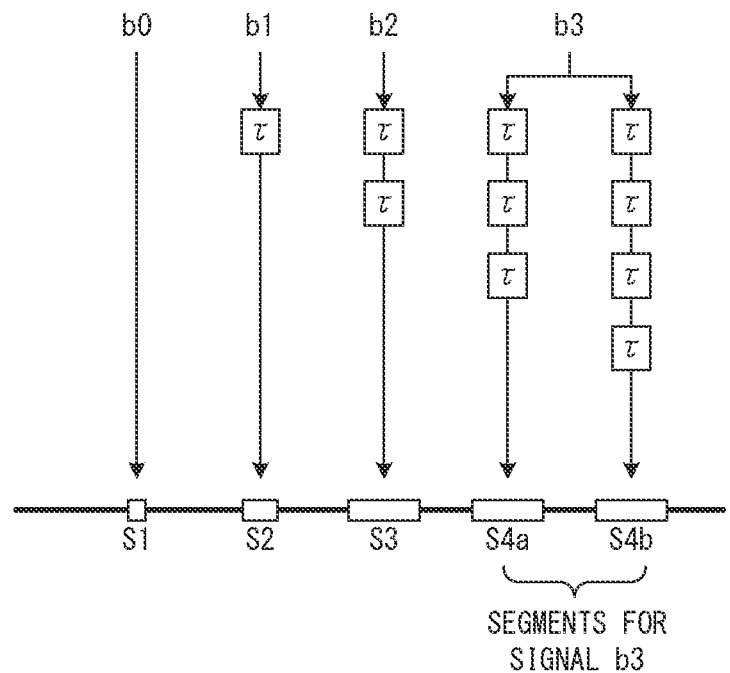
FIGS. 14A and 14B illustrate still other configuration examples of a delay adjustment circuit in an optical modulator.
Figure 14B:
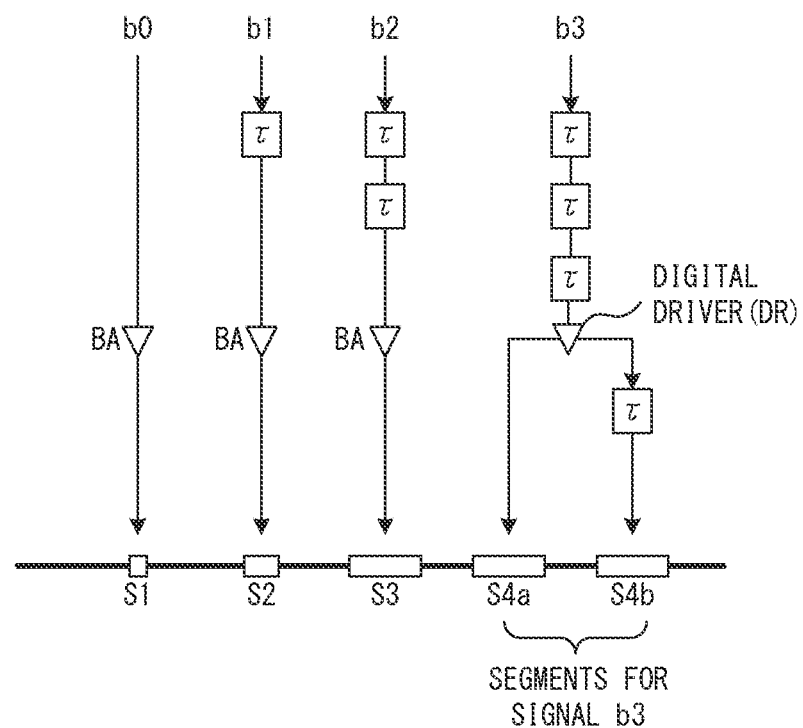

FIGS. 14A and 14B illustrate still other configuration examples of a delay adjustment circuit in an optical modulator. Note that the configurations of the segments in FIGS. 14A and 14B are the same as those in FIG. 12A or 13A.

Electric signals b0-b3 to be used as drive signals for the optical modulators depicted in FIGS. 14A and 14B are directly delayed by delay elements. In particular, as depicted in FIG. 14A, the signal b1 is delayed by one delay element $\tau$, and the signal b2 is delayed by two delay elements $\tau$. The signal b3 to be applied to the segment S4a is delayed by three delay elements $\tau$, and the signal b3 to be applied to the segment S4b is delayed by four delay elements $\tau$.

As depicted in FIG. 14B, the signal b3 may be split by a digital driver DR after being delayed by three delay elements τ. In this case, one of the output signals of the digital driver DR is guided to the segment S4a without passing via a delay element, and the other one of the output signals of the digital driver DR is guided to the segment S4b via one delay element τ. This configuration decreases the number of delay elements. When a signal is, as depicted in FIG. 14B, split using a digital driver DR, a buffer amplifier BA for compensating for a delay time that occurs at the digital driver DR may be provided.

Figure 15:
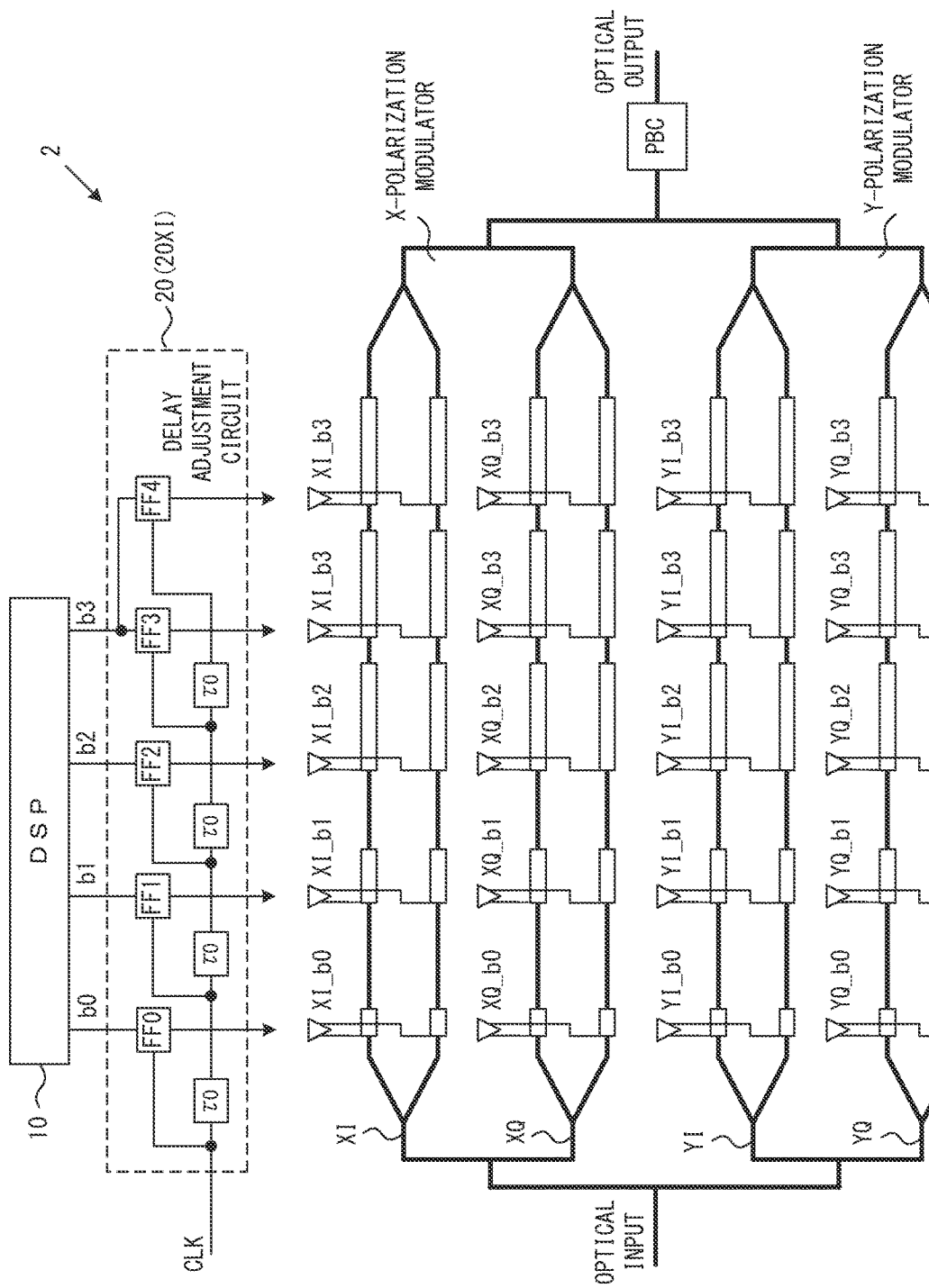
FIG. 15 illustrates an example of a QAM modulator.

FIG. 15 illustrates an example of a QAM modulator. In this example, an optical modulator 2 generates a polarization multiplexed optical signal. Thus, the optical modulator 2 includes an X-polarization modulator and a Y-polarization modulator. The X-polarization modulator and the Y-polarization modulator are each an IQ modulator. In particular, the X-polarization modulator includes an XI modulator and an XQ modulator, and the Y-polarization modulator includes a YI modulator and a YQ modulator. The XI modulator, the XQ modulator, the YI modulator, and the YQ modulator are each implemented by the configuration depicted in FIG. 9. In this example, the XI modulator, the XQ modulator, the YI modulator, and the YQ modulator each transmit four bits of data for each symbol.

The DSP 10 generates transmission data b0-b3 for each of the XI modulator, the XQ modulator, the YI modulator, and the YQ modulator. Specifically, data XI_b0-XI_b3 are generated for the XI modulator, data XQ_b0-XQ_b3 are generated for the XQ modulator, data YI_b0-YI_b3 are generated for the YI modulator, and data YQ_b0-YQ_b3 are generated for the YQ modulator. Transmission data b0-b3 generated by the DSP 10 are supplied to a corresponding modulator via a delay adjustment circuit 20. Although FIG. 15 depicts only a delay adjustment circuit 20 (20XI) for delaying a signal to be supplied to the XI modulator, a delay adjustment circuit 20 will actually be provided for each of the XI modulator, the XQ modulator, the YI modulator, and the YQ modulator.

The XI modulator, the XQ modulator, the YI modulator, and the YQ modulator each generate an amplitude-modulated optical signal indicating four bits of data. For example, a 16PAM optical signal may be generated. For each polarization, an I component and a Q component are combined with, for example, a phase difference of π/2. As a result, a 256 quadrature-amplitude-modulated (QAM) optical signal is generated for each polarization. In addition, an output optical signal of the X-polarization modulator and an output optical signal of the Y-polarization modulator are combined by the polarization beam combiner PBC so as to generate a polarization multiplexed optical signal.

In the example depicted in FIG. 15, the timings of clock signals input to flip-flop circuits F are adjusted. However, the configuration of the delay adjustment circuit 20 is not limited to this. For example, the delay adjustment circuit 20 may adjust the timing of a data signal to be used as a drive signal.

Precise timing adjustments can be attained more easily in a configuration in which clock signals are delayed (hereinafter, "clock delay scheme") than in a configuration in which data signals are delayed (hereinafter, "data delay scheme"). However, a delay that is greater than the sampling interval (e.g., clock period) of a flip-flop circuit may be incapable of being generated in the clock delay scheme. Hence, the data delay scheme may be more advantageous when, for example, many bits are transmitted for each symbol and there are many segments.

Figure 16:
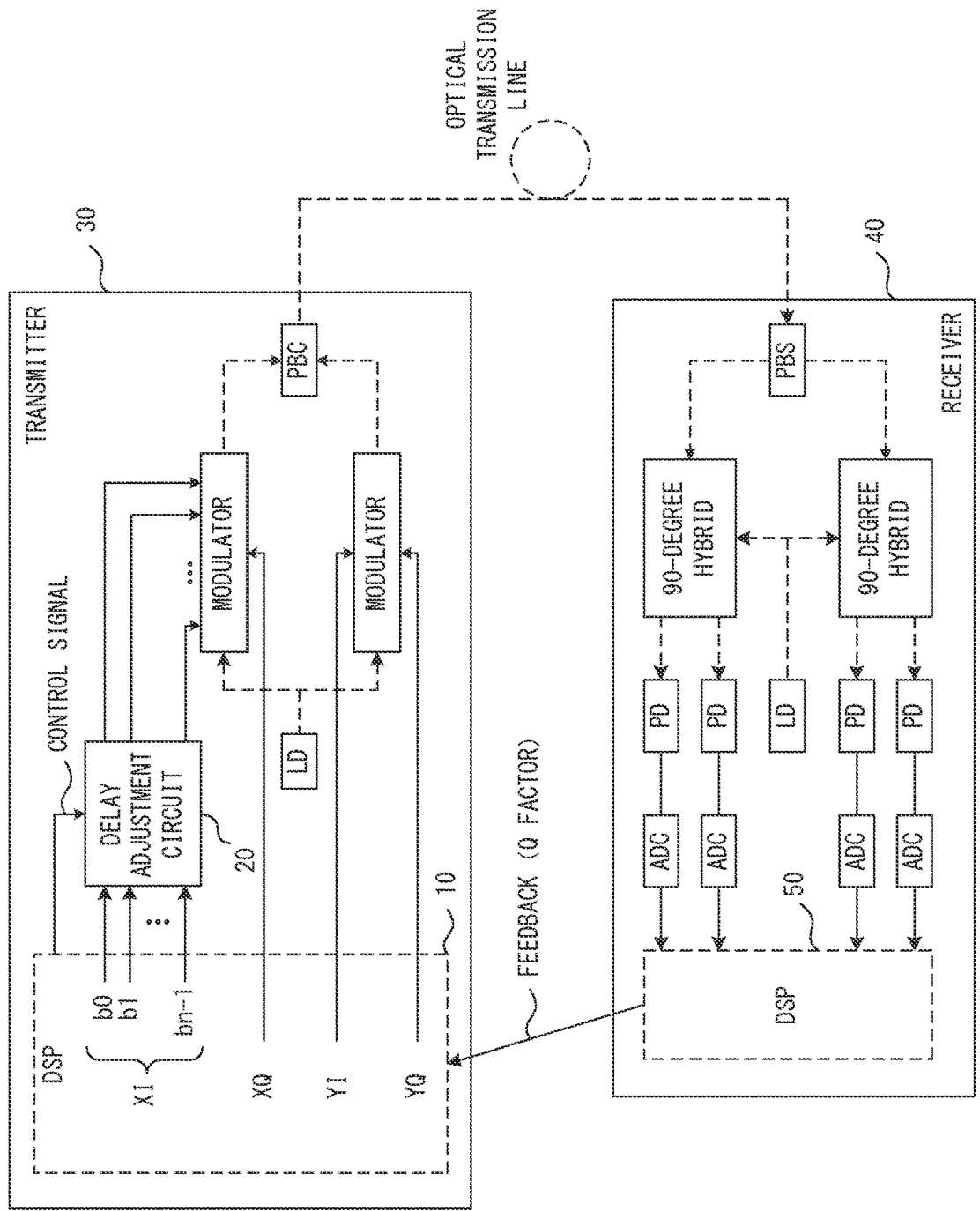
FIG. 16 illustrates an example of an optical communication system in which optical modulators in accordance with embodiments of the invention are used.

FIG. 16 illustrates an example of an optical communication system in which the optical modulators in accordance with embodiments of the invention are used. In this example, a transmitter 30 includes the optical modulator 2 depicted in FIG. 15. The transmitter 30 generates a polarization multiplexed optical signal for carrying transmission data. The polarization multiplexed optical signal is transmitted to a receiver 40 via an optical transmission line.

The receiver 40 recovers data from a received optical signal. A polarization beam splitter PBS separates the received optical signal into components orthogonal to each other. 90-degree hybrid circuits are coherent receivers and separate an I component and a Q component from each other by using local oscillation light generated by a local light source LD. Photodetectors PD convert the received optical signal into an electric signal. Analog-to-digital converters ADC convert an electric signal indicating the received optical signal into a digital signal. A DSP 50 detects, according to a digital signal indicating the received optical signal, signal points at which symbols are mapped, and recovers data from the phases and amplitudes of the detected signal points.

The DSP 50 detects a Q factor indicating the quality of a received optical signal. The Q factor may be, but is not particularly limited to, a distortion in the waveform of the received optical signal or the optical S/N ratio or error rate of the received optical signal. The DSP 50 reports the detected Q factor to the transmitter 30. In particular, a Q factor indicating the quality of the received optical signal is sent as feedback from the receiver 40 to the transmitter 30. The Q factor is periodically reported to the transmitter 30.

The DSP 10 in the transmitter 30 controls the delay adjustment circuit 20 according to a Q factor reported from the receiver 40. Specifically, the DSP 10 controls the delay adjustment circuit 20 so as to improve the Q factor. For example, when the delay adjustment circuit 20 includes the delay adjustment circuit depicted in FIG. 7A, the DSP 10 may adjust the voltage of the DC power supplies according to a Q factor. When the delay adjustment circuit 20 includes the delay adjustment circuit depicted in FIG. 7B, the DSP 10 may adjust the capacitance of the variable capacitors according to a Q factor.

Through the feedback control, the timings of a plurality of electric signals to be supplied to the optical modulator are optimized, thereby improving the quality of an optical signal. In embodiments of the invention, the plurality of delay elements implemented in the delay adjustment circuit 20 have the same circuit configuration. Hence, the complexity of control of the circuit for adjusting the timings of a plurality of electric signals for driving the optical modulator is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:
1. An optical modulator that generates an optical signal based on three or more electric signals transmitted in parallel, the optical modulator comprising:
a Mach-Zehnder interferometer; and three or more segments that are provided in series along an optical path of the Mach-Zehnder interferometer and respectively shift a phase of light propagating through the optical path based on the three or more electric signals, wherein a length of at least one of the three or more segments is different from lengths of the other segments, and optical path lengths from input ends of respective segments to input ends of corresponding next segments are the same.

2. The optical modulator according to claim 1, further comprising:

a delay adjustment circuit that adjusts timings of the three or more electric signals, wherein the three or more segments include a first segment, a second segment provided on an output side of the first segment, and a third segment provided on an output side of the second segment, the delay adjustment circuit delays, with respect to a first electric signal to be supplied to the first segment, a second electric signal to be supplied to the second segment by a first delay time indicating a time required for light to propagate from the input end of the first segment to the input end of the second segment through the optical path of the Mach-Zehnder interferometer, and delays a third electric signal to be supplied to the third segment with respect to the first electric signal by a second delay time indicating a time required for light to propagate from the input end of the first segment to the input end of the third segment through the optical path of the Mach-Zehnder interferometer.

3. The optical modulator according to claim 2, wherein a length of the second delay time is twice a length of the first delay time.

4. The optical modulator according to claim 2, wherein by using a plurality of delay elements having the same circuit configuration, the delay adjustment circuit delays the second electric signal with respect to the first electric signal by the first delay time and delays the third electric signal with respect to the first electric signal by the second delay time.

5. The optical modulator according to claim 2, wherein the delay adjustment circuit includes a delay circuit that delays a first clock signal by the first delay time so as to generate a second clock signal and delays the first clock signal by the second delay time so as to generate a third clock signal, a first flip-flop circuit that holds the first electric signal and outputs the first electric signal in response to the first clock signal, a second flip-flop circuit that holds the second electric signal and outputs the second electric signal in response to the second clock signal, and a third flip-flop circuit that holds the third electric signal and outputs the third electric signal in response to the third clock signal.

6. The optical modulator according to claim 5, wherein the delay circuit includes a plurality of delay elements having the same configuration and connected in series, the second clock signal is output from a first delay element among the plurality of delay elements, and the third clock signal is output from a second delay element among the plurality of delay elements that is provided on an output side of the first delay element.

7. The optical modulator according to claim 2, wherein the first electric signal, the second electric signal, and the third electric signal are respectively supplied to the input ends of the first segment, the second segment, and the third segment.

8. An optical modulation method for generating an optical signal based on three or more electric signals transmitted in parallel, wherein an optical modulator for generating the optical signal includes a Mach-Zehnder interferometer and three or more segments that are provided in series along an optical path of the Mach-Zehnder interferometer and respectively shift a phase of light propagating through the optical path based on the three or more electric signals, a length of at least one of the three or more segments is different from lengths of the other segments, and optical path lengths from input ends of respective segments to input ends of corresponding next segments are the same, the optical modulation method comprising:

receiving quality information indicating a quality of the optical signal from a device that receives the optical signal; and adjusting, according to the quality information, timings at which the three or more electric signals are supplied to the three or more segments.

* * * * *